United States Patent [19]

Funahashi et al.

[11] Patent Number: 5,096,685
[45] Date of Patent: Mar. 17, 1992

[54] METHOD FOR MANUFACTURING FINE-GRAINED SILICON MONOXIDE

[75] Inventors: Toshihiko Funahashi; Kenichi Ueda; Ryoji Uchimura; Yukio Oguchi, all of Chiba, Japan

[73] Assignee: Kawasaki Steel Corporation, Japan

[21] Appl. No.: 561,235

[22] Filed: Jul. 27, 1990

Related U.S. Application Data

[63] Continuation of Ser. No. 241,767, Sep. 7, 1988, abandoned, which is a continuation of Ser. No. 891,245, Jul. 24, 1986, abandoned.

[30] Foreign Application Priority Data

Jul. 27, 1985 [JP] Japan .................. 60-165676

[51] Int. Cl.⁵ .......................................... C01B 33/113
[52] U.S. Cl. ................................ 423/325; 423/344
[58] Field of Search .......................... 423/325, 344

[56] References Cited

U.S. PATENT DOCUMENTS

| | | | |
|---|---|---|---|
| 1,997,741 | 4/1935 | Northrup | 422/202 |
| 2,160,969 | 6/1939 | Hansgirg | 422/244 |
| 2,743,168 | 4/1956 | Krohn et al. | 422/244 |
| 2,912,311 | 11/1959 | Mason et al. | 422/244 |
| 3,764,272 | 10/1973 | Sterling | 422/244 |
| 3,910,767 | 10/1975 | Jemal | 422/244 |
| 4,545,975 | 10/1985 | Kobayashi et al. | 422/202 |

FOREIGN PATENT DOCUMENTS

| | | | |
|---|---|---|---|
| 550958 | 12/1957 | Canada | 423/325 |
| 0216649 | 4/1987 | European Pat. Off. | 423/325 |
| 427412 | 4/1926 | Fed. Rep. of Germany | 323/56 |
| 59-8613 | 1/1984 | Japan . | |
| 50601 | 12/1984 | Japan . | |
| 2472635 | 12/1969 | U.S.S.R. | 423/325 |
| 804991 | 11/1958 | United Kingdom | 423/325 |

OTHER PUBLICATIONS

Hackh's Chemical Dictionary, Grant, 1986, pp. 736, 440 and 725.

*Primary Examiner*—Olik Chaudhuri
*Assistant Examiner*—Ken Horton
*Attorney, Agent, or Firm*—Austin R. Miller

[57] ABSTRACT

A system for manufacturing fine-grained SiO powder includes means for heating a mixture of an $SiO_2$ containing material and an Si and/or C containing material for generating SiO vapor, and for condensing the generated SiO vapor from a gaseous state in the presence of non-oxidizing gas and under substantially low pressure. Preferably, vacuum is maintained at the position where thermal reaction generates SiO vapor. Non-oxidizing gas serves for transferring vapor-state SiO and/or fine-grained SiO powder to an SiO collection chamber. This successfully prevents the SiO from being accumulated within a transfer pipe or duct and thus prevents the pipe or duct from being blocked. Furthermore, substantially low pressure (vacuum) atmosphere encourages SiO vapor generation from the reagent mixture and thus permits a lower heating temperature to cause SiO vapor generation.

24 Claims, 8 Drawing Sheets

1000 Å

METHOD FOR MANUFACTURING FINE-GRAINED SILICON MONOXIDE

This application is a continuation of application Ser. No. 241,767, filed 9/7/88 which is a continuation of application Ser. No. 891,245, filed 7/29/86, both now abandoned.

BACKGROUND OF THE INVENTION

The present invention relates generally to a method and a system for effectively manufacturing fine-grained solid-state silicon monoxide (SiO). More specifically, the invention relates to a method for producing fine SiO of grain size less than or equal to 1 μm in the amorphous form at substantially high yield, and further relates to a system for effectively implementing the process of the invention. In particular, the invention relates to a method and system for producing an industrially suitable fine SiO.

Fine-grained SiO powder is known as a very attractive material in the fine ceramic industries. For example, such fine-grained SiO is known as a material for making $Si_3N_4$, SiC and so forth. Substantially fine-grained SiO, such as that having a grain size of less than or equal to 1 μm is substantially active and thus useful as a material for ceramics.

Japanese Patent Second (examined) Publication (Tokko) Showa 59-50601 discloses the production of a fine-grained SiO powder. In the disclosed process, a mixture of silicon dioxide ($SiO_2$) and carbon (C) or $SiO_2$ and metallic silicon (Si) is heated at a temperature higher than or equal to 1500° C. under reduced pressure to cause a thermal reaction for generating SiO vapor. The SiO vapor generated is condensed into a fine-grained solid-state SiO powder having a grain size of 1 μm in amorphous form by causing adiabatic expansion in a nitriding or carbonizing reduction atmosphere or a pressure-reduced oxygen atmosphere.

Such a conventional production process for SiO is suitable for producing a small amount of fine SiO powder. However, when a large amount of SiO powder has to be produced, the conventional process and system encounter difficulties. For example, condensation of vapor-state SiO tends to be caused in the transporting duct or pipe for transporting the SiO vapor to the chamber in which adiabatic expansion is taking place. Condensation of SiO in the transporting duct causes accumulation of solid-state SiO in the duct, resulting in a blocked duct. Furthermore, the nozzle for discharging SiO vapor into the adiabatic expansion chamber is vulnerable to corrosion by SiO vapor and tends to be blocked by solid-state SiO condensed and accumulated in the nozzle.

Therefore, the process and system proposed in the aforementioned Japanese Patent Publication is considered as one for laboratory use and is, indeed, not applicable for industrial application.

Although SiO has been known as one important material in the ceramics industries, there has heretofore been no way of manufacturing large amounts of fine-grained SiO powder.

SUMMARY OF THE INVENTION

Therefore, it is the principal object of the present invention to provide a method and system for producing fine-grained SiO powder applicable for manufacture and adapted to effectively produce a large amount of SiO powder.

Another object of the invention is to provide a mass-production process and system for fine-grained SiO powder which can perform the SiO-producing process continuously.

A further object of the invention is to provide a method and system for producing SiO powder not including the step of adiabatic expansion in condensing vapor-state SiO into solid-state SiO.

In order to accomplish the aforementioned and other objects, our method for manufacturing fine-grained SiO powder includes the step of heating a reagent mixture of $SiO_2$ containing material and metallic silicon and/or carbon containing material for generating SiO vapor and the step of condensing the generated SiO vapor in a gaseous-state in the presence of a non-oxidizing gas and under a substantially low pressure.

The flow of non-oxidizing gas is preferably generated by maintaining the pressure at a level where thermal reaction to generate SiO vapor occurs at a substantially low pressure. Such gas flow serves as a carrier medium for transferring vapor-state SiO and/or fine-grained SiO powder to a SiO collection chamber. This successfully prevents the SiO from being condensed and accumulated in a transfer pipe or duct, thus preventing the pipe or duct from becoming blocked. Furthermore, the substantially low pressure atmosphere encourages SiO vapor generation from the reagent mixture and a lower heating temperature suffices to cause SiO vapor generation.

In the preferred process, heat-treatment for the material reagent mixture is performed in a temperature range of 1300° C. under a pressure lower than or equal to 0.1 atm.

In a further preferred process zircon, mullite, wollastonite and so forth are used as the $SiO_2$ containing materials. In such a case, a by-product, such as zirconia, alumina, calcia and so forth of substantially high purity can be simultaneously produced. Petroleum coke, coal pitch, carbon-black, organic resin and so forth are used as the carbon containing material. Furthermore, $N_2$ gas, Ar gas, CO gas and so forth are used as the non-oxidizing gas.

In order to accomplish the aforementioned objects, the SiO producing system according to the invention comprises a furnace defining a chamber in which a material reagent mixture is heated at a predetermined temperature for generating SiO vapors. Heat-treatment is performed in a non-oxidizing atmosphere and under substantially low pressure. The relatively low pressure is achieved in the reaction chamber through an associated SiO collection chamber. The achievement of substantially low pressure through the SiO collection chamber causes a flow of non-oxidizing gas from the reaction chamber to the SiO collecting chamber. This non-oxidizing gas flow is used as a carrier medium for the SiO vapor generated in the reaction chamber or the fine-grained SiO condensed from the SiO vapor.

A non-oxidizing gas source is connected to the reaction chamber for continuously supplying the non-oxidizing gas to maintain the atmosphere of the reaction chamber as a substantially non-oxidizing atmosphere in the preferred construction.

More preferably, the SiO producing system includes a supply of material reagent mixture in a manner that allows continuous operation of the system for mass-production of the fine-grained SiO powder.

In addition, the system is provided with means for collecting material from which the SiO is removed. Such remaining material (for example, zirconia, calcia, alumina) constitutes a by-product of substantially high purity.

According to one aspect of the invention, a method for producing a fine-grained SiO powder comprises the steps of:

providing a material mixture as a mixture of an $SiO_2$ containing material and a metallic Si and/or C containing material;

heating the material mixture under non-oxidizing conditions and at a substantially low pressure atmosphere for generating vapor-state SiO;

condensing the vapor-state SiO into fine-grained solid-state SiO; and collecting the condensed fine-grained solid-state SiO.

Preferably, a chamber for heating the material mixture and a chamber for condensing the vapor-state SiO are provided. A flow of non-oxidizing gas from the reaction chamber to the condensing chamber is generated from transfer of the vapor-state SiO from the reaction chamber to the condensing chamber. The generation of non-oxidizing gas flow includes reducing the internal pressure of the reaction chamber through the condensing chamber. More preferably, the non-oxidizing gas is continuously supplied to the reaction chamber to maintain the aforementioned reaction chamber as a non-oxidizing atmosphere.

The $SiO_2$ containing material is selected from zircon $(ZrO_2)$, mullite $(Al_2O_3.2SiO_2)$, wollastonite $(CaO.SiO_2)$ and $SiO_2$ powder of high purity to perform the aforementioned method. The C containing material is selected from petroleum coke, coal pitch, carbon-black and organic resin. In addition, the non-oxidizing gas is selected from $N_2$ gas, Ar gas and CO gas.

The method may further include the step of collecting the remaining material mixture as a by-product after removing the SiO. The by-product to be obtained is zirconia $(ZrO_2)$ of high purity when the $SiO_2$ containing material is zircon. On the other hand, when the $SiO_2$ containing material is mullite $(Al_2O_3.2SiO_2)$, the by-product obtainable from the aforementioned process is alumina $(Al_2O_3)$ of high purity. Further, when the $SiO_2$ containing material is wollastonite $(CaO.SiO_2)$, the by-product to be obtained is calcia $(CaO)$ of high purity.

In order to implement the aforementioned method, a device used in another aspect of the invention comprises means for heating the material mixture as a mixture of an $SiO_2$ containing material and a metallic Si and/or C containing material, in a non-oxidizing and substantially low pressure atmosphere for generating vapor-state SiO, and means for condensing the vapor-state SiO into fine-grained solid-state SiO in the gaseous state, and collecting the condensed fine-grained solid-state SiO.

According to a further aspect of the invention, the aforementioned method is applied to an industrial process for manufacturing fine-grained SiO powder comprising the steps of:

preparing a material mixture mixture by mixing an $SiO_2$ containing material and a metallic Si and/or C containing material;

continuously supplying the material mixture into a reaction chamber;

heating the material mixture in the reaction chamber in the presence of non-oxidizing gas and in a substantially low pressure atmosphere for generating vapor-state SiO;

transferring the generated vapor-state SiO to a collecting chamber; and cooling the vapor-state SiO, thereby causing its condensation in the presence of the non-oxidizing gas, and collecting the condensed fine-grain SiO.

The material mixture is supplied intermittently at a predetermined rate which is controlled for allowing continuous operation of the SiO manufacturing process. In the alternative, the material is supplied continuously to cause the material mixture to travel through the reaction chamber within a predetermined period of time.

In order to implement the aforementioned industrially applied SiO manufacturing process, a system according to a further aspect of the invention comprises first means for continuously supplying a material mixture prepared by mixing an $SiO_2$ containing material and a metallic Si and/or C containing material, second means for receiving the material mixture from the first means and heating the material mixture in the presence of non-oxidizing gas and at a substantially low pressure atmosphere for generating vapor-state SiO, third means for cooling the vapor-state SiO for causing its condensation in the presence of the non-oxidizing gas and collecting the condensed fine-grain SiO powder, and fourth means for transferring the generated vapor-state SiO from the second means to the third means.

The system further comprises fifth means for introducing a vacuum into the third means for generating a non-oxidizing gas flow from the second means to the third means for transferring the vapor-state SiO by the gas flow. The system further comprises sixth means for continuously supplying the non-oxidizing gas into the second means to maintain the atmosphere in the second means in non-oxidizing condition.

Preferably, the system further comprises seventh means for pre-heating the material mixture before supplying the material mixture into the second means so that heating of the material mixture can be effectively performed in the second means.

As set forth according to the present invention, an industrially useful by-product is simultaneously produced with production of the fine SiO powder. Therefore, the system further comprises eighth means for cooling the material mixture after removing the SiO and collecting the remaining material as a by-product.

The first means comprises a plurality of carriages adapted to travel through the second means with the material mixture. The carriages are adapted to stop within the second means for a predetermined period of time.

The carriage preferably includes a muffle defining a reaction chamber to receive the material mixture and to cause a thermal reaction to generate the vapor-state silicon oxide.

The seventh means is provided upstream of the second means and the eighth means is provided downstream of the second means. The seventh means, second means and eighth means are aligned to form a path for the carriages.

In order to facilitate continuous operation, the system is arranged to place one of the carriages within the seventh means while the leading carriage stops within the second means, and to place another carriage within the eighth means while the following carriage stops within the second means.

Alternatively, the seventh means, second means and eighth means defines a continuous path for the material mixture. The path is filled with the material mixture and communicates with the first means for receiving a continuous supply of the material mixture for causing travel of the material mixture within the path through the seventh, second and eighth means. Preferably, the seventh, second and eighth means are vertically aligned.

In the latter case, the first means comprises a hopper communicating with the top of the seventh means.

BRIEF DESCRIPTION OF THE DRAWINGS

The present invention will be understood more fully from the detailed description given here below and from the accompanying drawings of the preferred embodiments of the invention. However, they should not be taken to limit the invention to the specific embodiment or embodiments shown, but are for explanation and understanding only.

In the drawings.

DESCRIPTION OF THE PREFERRED EMBODIMENTS

Figure 1:
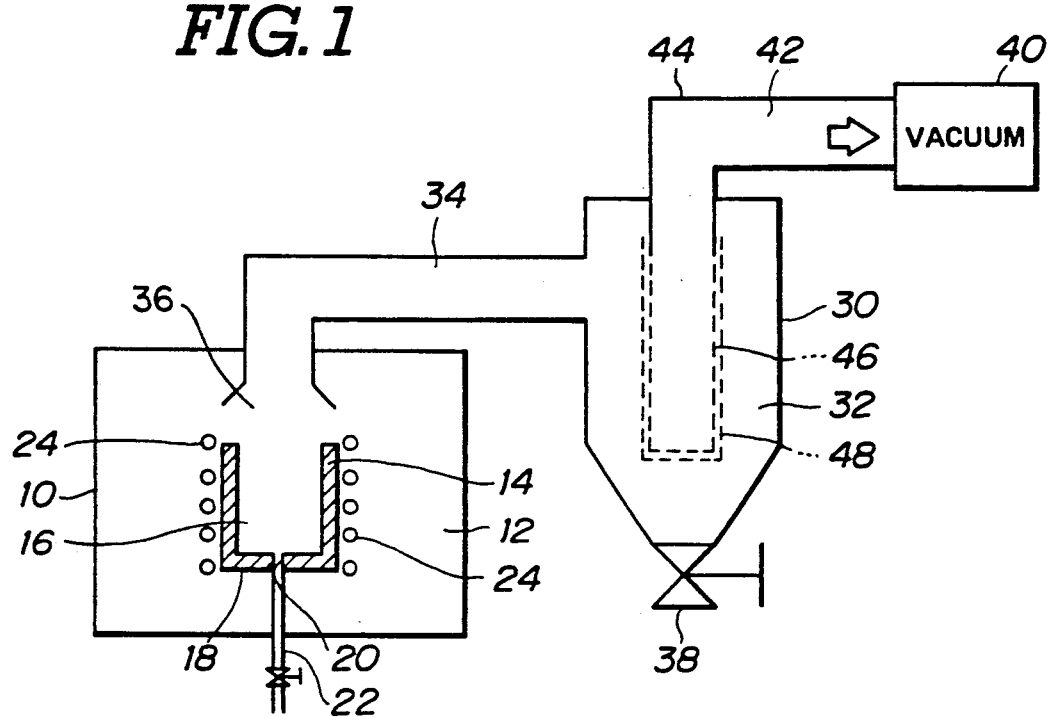
FIG. 1 is a fragmentary illustration showing a fundamental structure of a SiO producing system according to the invention.
Figure 2:
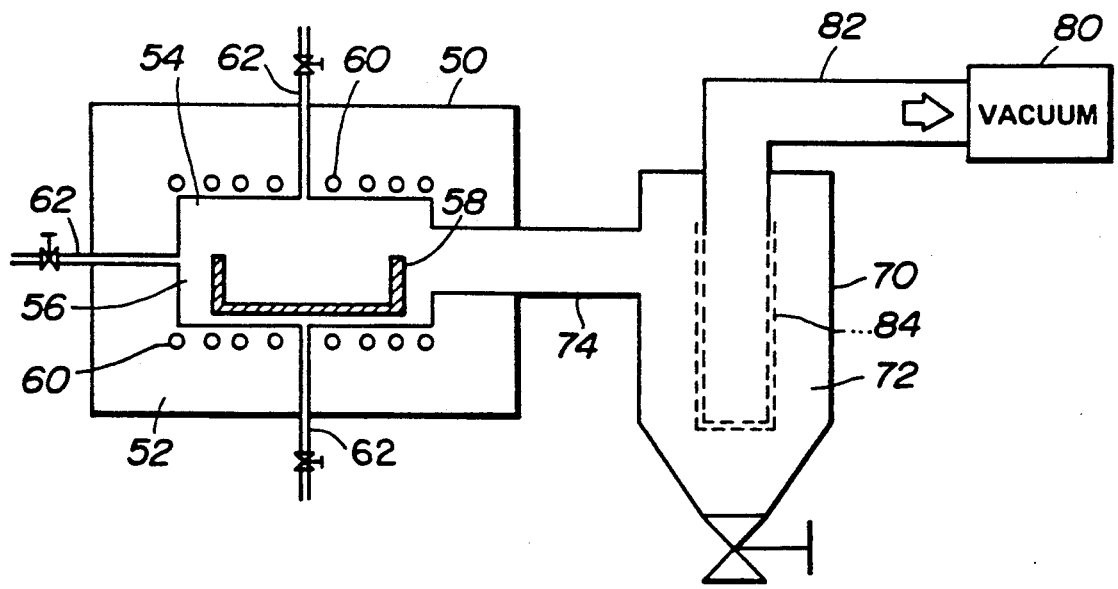
FIG. 2 is a fragmentary illustration of another fundamental construction of an SiO producing system according to the invention.

SiO producing systems according to the present invention are generally illustrated in FIGS. 1 and 2. In the arrangement of FIG. 1, the SiO producing system comprises a furnace 10 for heat-treating the reagent mixture, an SiO collection device 30 for collecting fine SiO produced by heat-treatment in the furnace, and a vacuum source 40 for applying a vacuum to the furnace and the collection device.

Furnace 10 generally comprises a vacuum furnace for heat-treatment of the reagent mixture under low-pressure conditions. Furnace 10 defines a furnace chamber 12. A reagent mixture container 14 is disposed within furnace chamber 12. Reagent mixture container 14 may comprise a crucible or the like and is an opened-top box of cylindrical configuration. Reagent mixture container 14 defines an internal reaction chamber 16. Bottom 18 of reagent mixture container 14 has an opening 20 in communication with a non-oxidizing gas induction tube 22 to introduce a non-oxidizing gas into reaction chamber 16 of reagent mixture container 14. A heater 24, such as a high-frequency coil or resistance-heating heater is installed in furnace chamber 12 to surround reagent mixture container 14.

The SiO collection device 30 defines an SiO collection chamber 32 therein. SiO collection chamber 32 connects to vacuum source 40 through a vacuum passage 42. Therefore, SiO collection chamber 32 is maintained at a pressure substantially lower than atmospheric pressure. On the other hand, SiO collection chamber 32 connects to furnace chamber 12 of furnace 10 via an SiO collection duct 34. SiO collection duct 34 has one end inserted into furnace chamber 12. A horn-shaped collection hood 36 is installed on one end of SiO collection duct 34. Collection duct 34 is placed above the top opening of reaction chamber 16 of reagent mixture container 14. Through SiO collection duct 34, the vacuum in collection chamber 32 of collection device 30 is introduced into furnace chamber 12 to hold the internal pressure in the furnace chamber substantially lower than atmospheric pressure.

A vacuum passage 42 is defined by a duct 44 having one end 46 inserted into SiO collection chamber 32. End 46 of duct 44 is covered by an SiO collection filter 48. Filter 48 serves to collect fine SiO particles drawn into the collection chamber through collection duct 34. The collected fine SiO particles are removed through a valve 38 in the floor of collection chamber 32.

In the preferred construction, heat-insulating layers are attached to the furnace walls of furnace 10. Alternatively, it is possible to provide cooling water passages within the furnace walls for cooling.

FIG. 2 shows another construction of the SiO producing system according to the invention. In this construction, a furnace 50 defines a furnace chamber 52. A muffle 54 is disposed within furnace chamber 52 to define therein a reaction chamber 56. A reagent mixture container 58 is disposed within reaction chamber 56. A heater 60 surrounds muffler 54 to be heated and induce the reagent mixture to react. One or more non-oxidizing gas introducing tubes 62 introduce non-oxidizing gas into reaction chamber 56 to expedite condensation of the SiO vapor generated by the reaction.

Similar to the system of FIG. 1, an SiO collection device 70 collects fine SiO particles produced within reaction chamber 56. SiO collection device 70 defines a collection chamber 72 connected to reaction chamber 56 in the furnace by means of a SiO collection duct 74. Collection chamber 72 is maintained at a pressure lower than atmospheric pressure by means of a vacuum pump 80 connected thereto through a vacuum duct 82. Since reaction chamber 56 communicates with the collection chamber via collection duct 74, reaction chamber 56 is also held at a pressure lower than atmospheric pressure.

An SiO collection filter 84 is attached to the end of vacuum duct 82 inserted into the collection chamber. Collection filter 84 serves to collect the fine SiO particles introduced into collection chamber 72 via collection duct 74.

In the SiO producing process according to the present invention, the reagent mixture includes an $SiO_2$-containing material and an Si- or C-containing material. Preferably, the $SiO_2$ in the $SiO_2$-containing material is of high purity to produce fine SiO particles with high purity. High-purity $SiO_2$ can be prepared from high-purity natural quartz, water glass and so forth by reaction with acid or $CO_2$ gas. As an alternative, $SiO_2$-containing oxide powder, such as zirconia ($ZrO_2.SiO_2$) powder, mullite ($3Al_2O_3.2SiO_2$) powder, wollastonite ($CaO, SiO_2$) powder and so forth, can be used as the $SiO_2$-containing material. $SiO_2$-containing metal oxide powders are preferred in industrial application since by-products of high purity, such as zirconia (ZrO₂), alumina (Al₂O₃), calcia (CaO) and so forth can be produced during production of SiO.

In addition, metallic silicon powder or a carboniferous material, such as petroleum, coke, coal pitch, carbon-black organic resins and so forth are mixed with the aforementioned SiO₂-containing material. If desired, a mixture of metallic silicon powder and a carboniferous material can be mixed with the SiO₂-containing material.

In the process according to the present invention, non-oxidizing gas is used to form a non-oxidizing atmosphere for heat-treatment of the regent mixture. This non-oxidizing gas induces condensation of the SiO vapor generated during the heat-treatment into fine grains. Gaseous N₂, Ar, CO and so forth may be used as the non-oxidizing gas.

In both of the systems of FIGS. 1 and 2, heat-treatment of the reagent mixture (the mixture of SiO₂-containing material and the Si- and/or C-containing regent) is performed in a non-oxidizing atmosphere at a pressure below 0.1 bar. Temperature is maintained in the range of 1300° C. to 2000° C. During heat-treatment under the conditions set forth above, reactions expressed by the following formulas occur:

$$SiO_2(l,s) + C(s) SiO(g) + CO(g) \quad (1)$$

$$SiO_2(l,s) + Si(s) 2SiO_2 \quad (2)$$

At atmospheric pressure, the temperature needed to induce the reaction of formula (1) is greater than or equal to 1750° C. By lowering the pressure to no more than 0.1 bar, the required temperature drops to about 1640° C. and by further lowering the pressure to below 0.01 bar, the required temperature drops further to about 1540° C. As will be appreciated herefrom, at low pressures, the temperature necessary for reaction is decreased.

A temperature range of 1300° C. to 2000° C. is preferred for effective SiO production and, at the same time, for producing the desired by-product. SiO vapor cannot be generated if the temperature is lower than 1300° C. On the other hand, if the temperature is higher than 2000° C., sintering occurs in the mixture, which interferes with generation of SiO vapor. Furthermore, unnecessarily high heat is obviously wasteful in view of SiO production costs.

The non-oxidizing gas entering the reaction chamber displaces the SiO vapor from the surface of the mixture and effectively and quickly cools the SiO vapor to induce condensation into fine grains. Furthermore, the flow of the non-oxidizing gas from the reaction chamber to the collection chamber driven by the vacuum effectively transports the condensed fine-grained SiO into the collection chamber.

The preferred molar ratios of the Si- and/or C-containing material relative to the SiO₂-containing material is 0.4 to 2.0. Furthermore, the preferred volumetric ratios of the non-oxidizing gas introduced into the reaction chamber in relation to the generated SiO vapor is in the range of 0.5 to 500.

Figure 3:
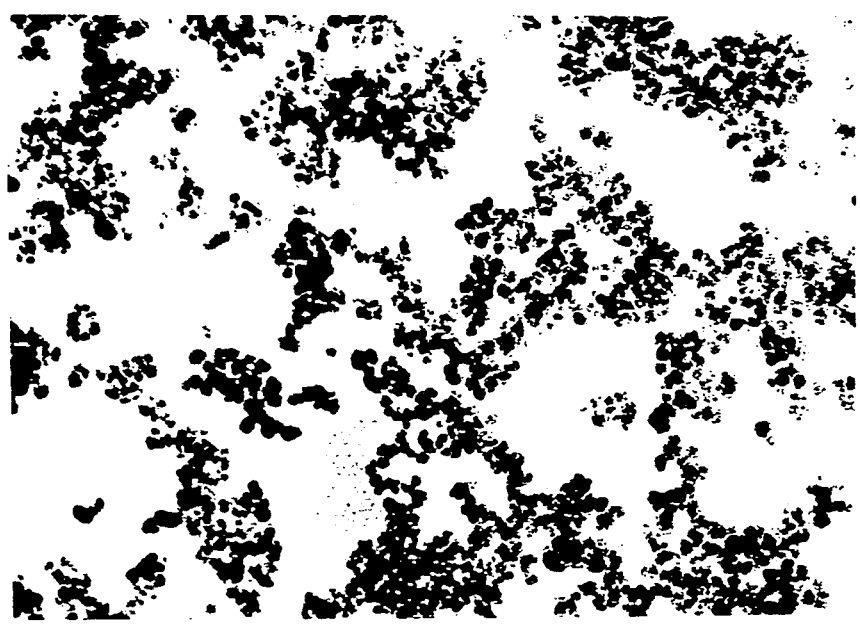
FIG. 3 is an electromicroscopic photograph showing a SiO product.
Figure 3:
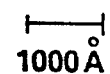

FIG. 3 is a electroscopic photograph of the fine-grained SiO produced during the production process according to the invention. The grain size of the SiO particles was less than or equal to 1 μm (1000 Å). Under better conditions it would be possible to obtain an SiO of a uniform grain size of 100 Å to 200 Å. The color of the SiO obtained was mud yellow. The obtained SiO was amorphous. When this fine SiO is treated under atmosphere, it changes into white SiO₂.

EXAMPLE 1

Experiments were performed with the SiO producing system of FIG. 1 to prove the efficiency of the SiO producing process according to the invention. Experiments were performed with SiO₂ powder containing 99.5% SiO₂, zircon powder containing 99.5% ZrO₂ and SiO₂, and wollastonite powder containing 99.5% CaO and SiO₂. The ratios of Si- and/or C-containing material, heating conditions and results are shown in the following TABLE I. The yield of SiO is given in relation to theoretical yield in weight percent (wt %).

An SiO producing process according to the conventional art was also used to obtain results for comparison. The SiO yields were compared to prove the efficiency of the inventive process.

TABLE I

| | REAGENT MIXTURE | | | HEAT-TREATMENT CONDITION | | | | | SiO COLLECTION RATE (wt %) |
|---|---|---|---|---|---|---|---|---|---|
| | SiO₂ SOURCE | REDUCTION AGENT | MIXTURE RATIO | TEMP. (°C.) | TIME (hr) | PRESSURE (atm) | SPECIES | GAS VOLUME RATIO | |
| COMP. EX. 1 | SiO₂ | COAL PITCH | C/SiO₂ = 1.3 | 1550° C. | 5 | 0.0002 | — | 0 | 15 |
| COMP. EX. 2 | " | " | C/SiO₂ = 1.3 | 1550° C. | 5 | 0.2 | Ar | 5 | 45 |
| EX. 1 | " | " | C/SiO₂ = 1.3 | 1550° C. | 5 | 0.09 | Ar | 5 | 67 |
| COMP. EX. 3 | " | " | C/SiO₂ = 1.3 | 1250° C. | 100 | 0.001 | Ar | 1 | 25 |
| EX. 2 | " | " | C/SiO₂ = 1.3 | 1400° C. | 100 | 0.001 | Ar | 1 | 57 |
| COMP. EX. 4 | " | " | C/SiO₂ = 0.3 | 1600° C. | 3 | 0.01 | Ar | 5 | 45 |
| EX. 3 | " | " | C/SiO₂ = 0.5 | 1600° C. | 3 | 0.01 | Ar | 5 | 60 |
| EX. 2 | " | " | C/SiO₂ = 2.0 | 1600° C. | 3 | 0.01 | Ar | 5 | 81 |
| COMP. EX. 5 | " | " | C/SiO₂ = 2.5 | 1600° C. | 3 | 0.01 | Ar | 5 | 43 |
| EX. 5 | " | Si | Si/SiO₂ = 1.2 | 1700° C. | 2 | 0.01 | H2 | 10 | 170 |
| EX. 6 | (ZrO₂.SiO₂) | PETROLEUM COKE | C/SiO₂ = 1.0 | 1600° C. | 3 | 0.01 | H2 | 10 | 93 |
| EX. 7 | " | Si | Si/SiO₂ = 1.0 | 1700° C. | 2 | 0.01 | H2 | 10 | 180 |
| COMP. EX. 6 | (CaO.SiO₂) | CARBON BLACK | C/SiO₂ = 1.5 | 1550° C. | 10 | 0.01 | Ar | 0.3 | 31 |
| EX. 8 | " | " | C/SiO₂ = 1.5 | 1550° C. | 10 | 0.01 | Ar | 0.6 | 59 |
| EX. 9 | " | " | C/SiO₂ = 1.5 | 1550° C. | 10 | 0.1 | Ar | 50 | 85 |

As will be appreciated from TABLE I above, the yield of fine-grained SiO is remarkably improved by the invention process.

EXAMPLE 2

Other experiments were performed using zircon powder containing 99.5% $ZrO_2$ and $SiO_2$. Average grain size of the zircon powder was 0.95 μm. The zircon powder was mixed with carbon-black which is available in the market under the tradename SHI-SUTOU 6 from Tokai Carbon K.K. The grain size of the carbon black was 210 Å. A uniform mixture of zircon powder and carbon-black was prepared. The mixture was shaped into a solid cylindrical mass, 15 mm in diameter×300 mm high. A plurality of cylindrical masses were prepared. The SiO producing process according to the present invention was performed utilizing the SiO producing system of FIG. 2 under the conditions shown in the following TABLE II. The purity of the zirconia powder produced as a by-product and the yield of SiO were checked in these experiments.

The mol ratio ($C/SiO_2$) of SiO in the zircon powder and C in the carbon-black was adjusted to 1.2. The yield of SiO is given in relation to theoretical yield in percent by weight (wt %). Ar gas was used as a non-oxidizing gas in volumetric ratios of 10:1 relative to the SiO vapor.

As will be appreciated from the foregoing experiments, the SiO producing process according to the present invention provides a higher SiO yield than the prior art. Therefore, by utilizing the inventive process in industry, the efficiency of fine-grained SiO production can be increased. Furthermore, in parallel to the production of fine-grained SiO, high purity by-products, such as zirconia, alumina, calcia and so forth can be obtained.

TABLE II

| | HEAT-TREATMENT CONDITION | | | | | ZIRCONIA | SiO |
|---|---|---|---|---|---|---|---|
| | ZIRCON + C WEIGHT (kg) | TEMP (°C.) | TIME (hr) | PRESSURE (atm) | atmosphere | PRUITY (wt %) | COLLECTION RATE (wt %) |
| EX. 10 | 3 | 1500 | 5 | 0.01 | Ar | 98.6 | 90 |
| EX. 11 | 3 | 1600 | 3 | 0.01 | Ar | 98.7 | 95 |
| EX. 12 | 10 | 1500 | 6 | 0.01 | Ar | 98.5 | 95 |
| EX. 13 | 10 | 1600 | 4 | 0.01 | Ar | 98.7 | 96 |

The following disclosure is directed to preferred embodiments of the SiO manufacturing processes and systems for industrial implementation of the aforementioned process of SiO production according to the present invention.

Continuous operation of the producing plant or system is regarded as an essential factor in view of production capacity and efficiency. Therefore, the following embodiments are directed to continuous SiO production.

Figure 4:
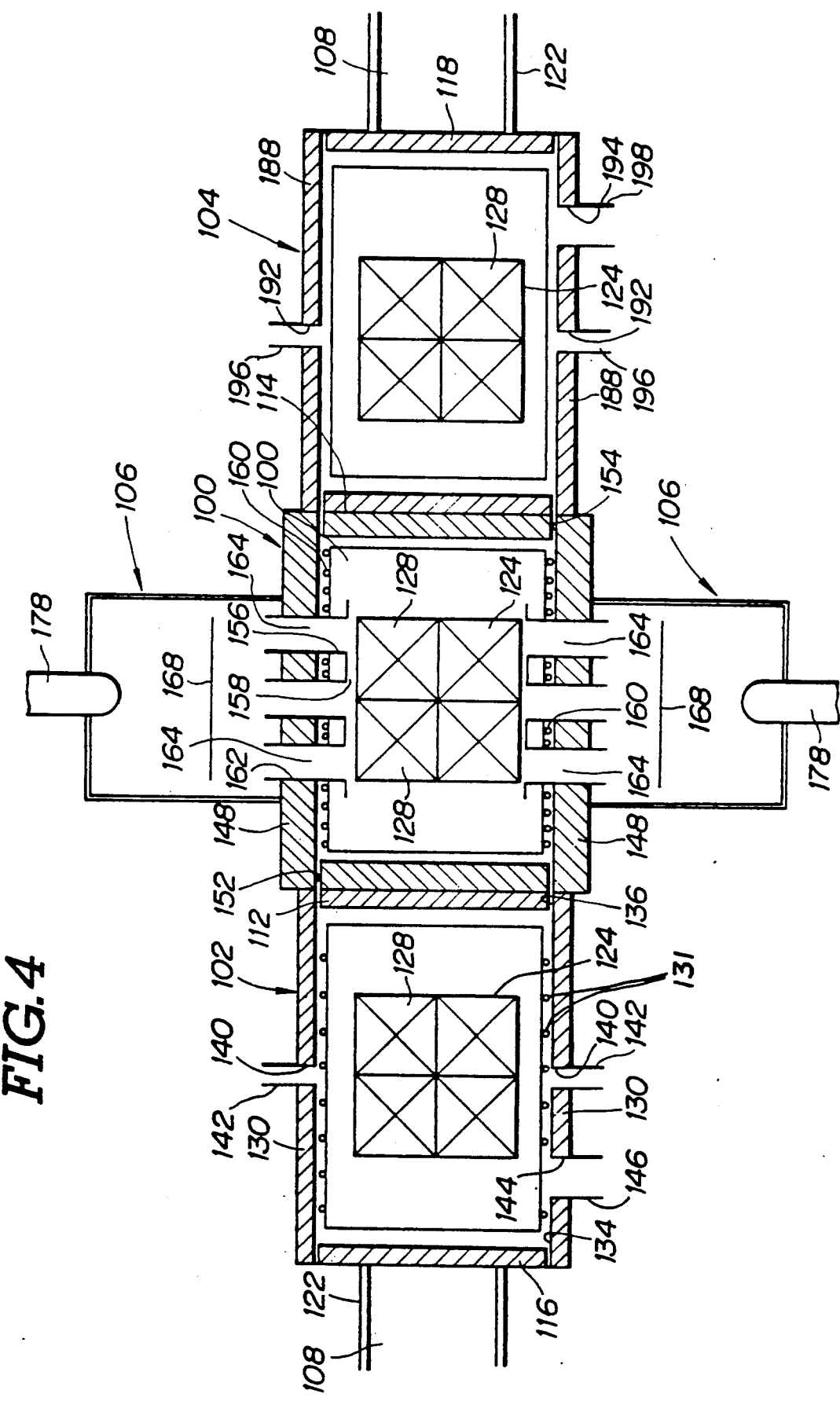
FIG. 4 is a plan view of the preferred embodiment of a SiO manufacturing system according to the invention.
Figure 5:
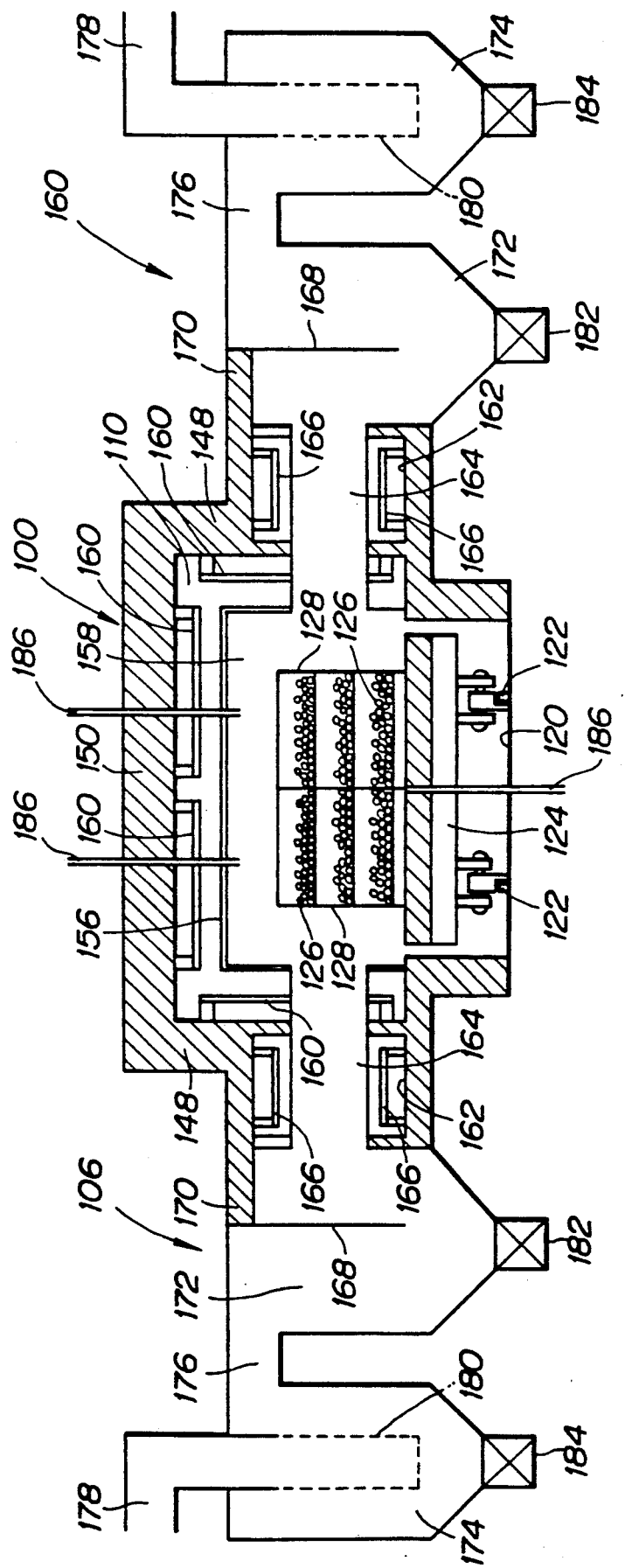
FIG. 5 is a transverse section of the SiO producing system of FIG. 4, in the portion of the heating furnace.

FIGS. 4 and 5 show another embodiment of an SiO manufacturing system according to the present invention. The first embodiment of the SiO manufacturing system generally comprises heating furnace 100, pre-heating chamber 102, cooling chamber 104, and SiO collection chambers 106. Pre-heating chamber 102, heating furnace 100 and cooling chamber 104 are arranged in line along platform 108. Furnace chamber 110, in the heating furnace 100, connects to pre-heating chamber 102 and cooling chamber 104. Doors 112 and 114 separate pre-heating chamber 102 from furnace chamber 110 and the furnace chamber from cooling chambers 104. The other end of pre-heating chamber 102 has a door 116. Similarly, the other end of cooling chamber 104 is closed by a door 118.

A pair of rails 122 are fixedly secured to floor 120 of platform 108, thus defining a railway extending through pre-heating chamber 102, furnace chamber 110 and cooling chamber 104. One or more carriages 124 run along the railway carrying reagent mixture 126. As set forth above, reagent mixture 126 is composed of an $SiO_2$-containing material, such as high-purity $SiO_2$ powder, zircon powder, mullite powder, wollastonite powder and so forth, and an Si- and/or C-containing material, such as metallic silicon, petroleum, coke, coal pitch, carbon-black, organic resin and so forth. This reagent mixture is received within material container 128. A plurality of the material containers 128 are mounted on carriage 124 to be carried along railway 122.

It is preferable to provide more than three carriages 124, each transporting a plurality of reagent mixture containers 128 to facilitate continuous operation of the SiO producing system. Carriages 124 may be driven step-wise to stop at pre-heating chamber 102, furnace chamber 110 and cooling chamber 104 for a predetermined period of time. The period of time carriages 124 spend in each chamber is determined according to the heat-treatment time needed to produce fine-grained SiO in furnace chamber 110.

Pre-heating chamber 102 is defined by vertically extending side walls 130 and a ceiling (not shown). Pre-heating chamber 102 has an entrance opening 134 and an exit opening 136, respectively closed by doors 116 and 112. Side walls 130, the ceiling and doors 112, 116 are provided with heat-insulating liners. Alternatively, side walls 130, the ceiling and doors 112, 116 can be made of a substance containing a heat-insulating component. Furthermore, if necessary, side walls 130 and the ceiling may be provided with cooling water passages extending therethrough for effective cooling.

A heater means 130 is disposed within pre-heating chamber 102. As will be seen from FIG. 4, heater means 130 comprises heat generators, such as a high-frequency coil, resistance heater or the like arranged on either side of the path of carriages 124. One or more non-oxidizing gas inlets 140 in side wall 130 and/or the ceiling admit non-oxidizing gas in pre-heating chamber 102. Non-oxidizing gas inlets 140 connect to induction pipes 142 connected in turn to a non-oxidizing gas source (not shown). An exhaust port 144 in side wall 130 or the ceiling connects to an exhaust pipe 146 to vent the inert gas into the atmosphere.

Figure 6:
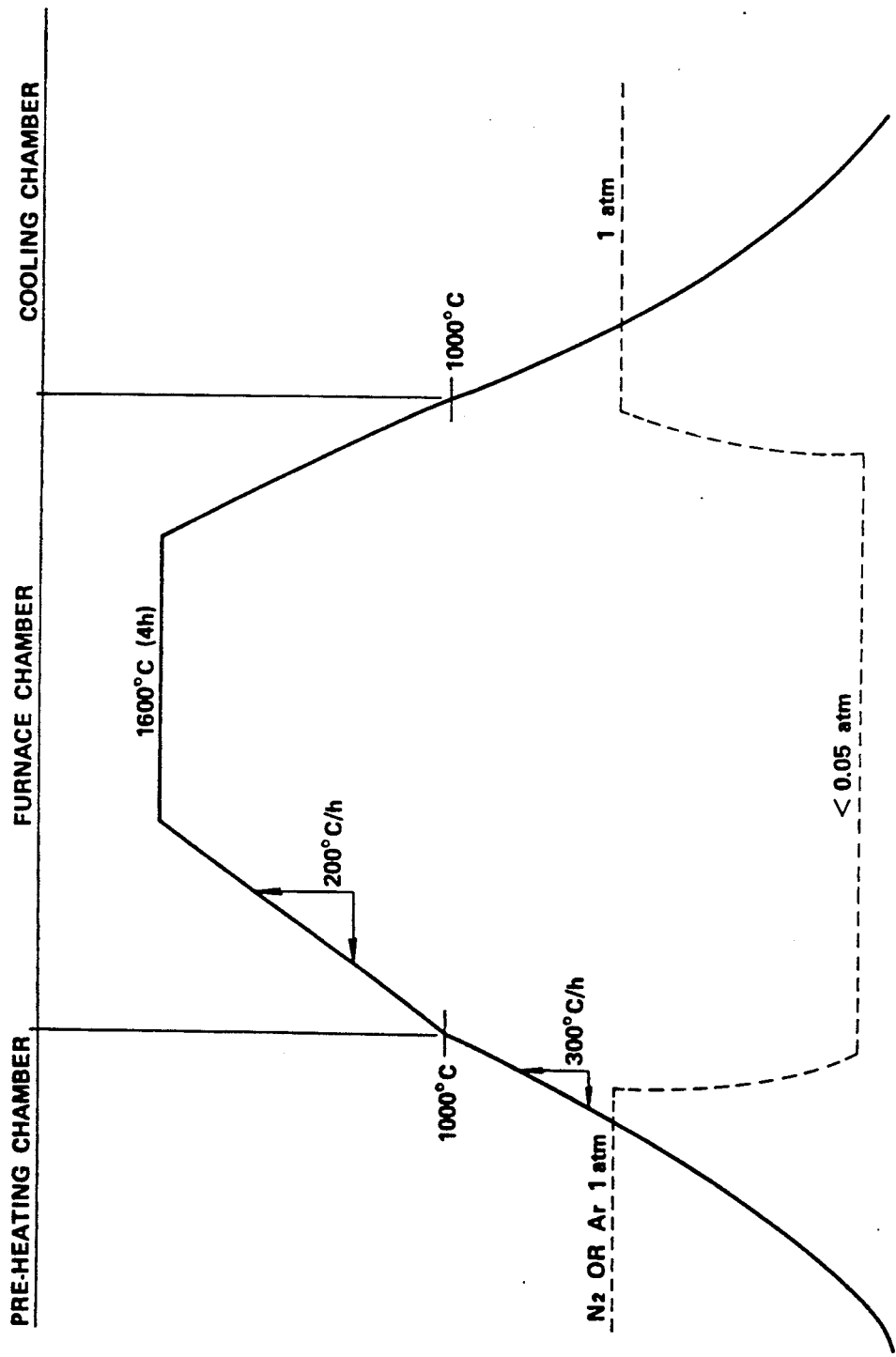
FIG. 6 is a chart showing temperature distribution in the SiO producing system of FIGS. 4 and 5.

Doors 112 and 116 allow carriage 124, with the reagent mixture containers 128, to pass when open and insulate preheating chamber 102 from the atmosphere and from the furnace chamber during pre-heating when closed. As shown in FIG. 6, preheating is performed at a temperature of approximately 1000° C.

Actuators automatically open and close doors 112 and 116. More preferably, the system includes a door control system having sensors for detecting when carriages 124 approach entrance opening 134 and exit opening 136. The sensors automatically activate the actuators to open and close the doors. In this case, the progress of carriages 124 along railway 122 can be controlled.

Side walls 148 and ceiling 150 of heating furnace 100 define furnace chamber 110. Furnace chamber 110 has an entrance opening 152 and an exit opening 154 similar to pre-heating chamber 102. Entrance opening 152 adjoins exit opening 136 of pre-heating chamber 102. Communication between pre-heating chamber 102 and furnace chamber 110 is established and blocked depending upon the position of door 112. Likewise, exit opening 154 of furnace chamber 110 is closed by door 114. Side walls 148, ceiling 150, and door 114 are provided with heat-insulating liners, or are made of a substance containing a heat-insulating component.

A muffle 156 in furnace chamber 110 surrounds carriage 124 when in the heating position. Muffle 156 defines a reaction chamber 158 in which the reagent mixture reacts to generate SiO vapor.

A heating means 160 installed in furnace chamber 110 surrounding muffle 156 heats the reagent mixture on carriage 124 within reaction chamber 158 to a temperature sufficient to generate SiO vapor, i.e. in a temperature range of 1300° C. to 2000° C. as set forth with respect to FIG. 1. In a manner similar to the heating means in pre-heating chamber 102, heating means 160 of furnace chamber 110 may be high-frequency coils, resistance heaters, or the like arranged along both sides of the carriage path.

Side walls 150 have communication passages 162 connecting furnace chamber 110 to SiO collection chambers 106. SiO collection ducts 164 extend from muffle 156 and pass through communication passages 162 to establish communication between reaction chamber 158 and SiO collection chamber 106. Auxiliary heaters 166, are provided within communication passages 162 surrounding SiO collection pipes 164. Auxiliary heaters 166 heat the SiO collection pipes to keep the SiO vapor generated in reaction chamber 158 in vapor form.

Heat insulators plates 168 oppose the outlet of SiO collection pipes 164. Heat insulator plates 168 extend downwardly from extensions 170 of the side walls.

Each SiO collection chamber 106 is divided into two sections 172 and 174 communicating with each other through a communication passage 176 near the ceilings of the sections. A vacuum duct 178 connects to a vacuum source, such as a vacuum pump (not shown), and is inserted into section 174 of SiO collection chamber 106 for producing a vacuum. Vacuum duct 178 has a bag-filter 180 at the end inserted into section 174 of the SiO collection chamber. Bag-filter 180 prevents SiO drawn from reaction chamber 158 to the SiO collection chamber from flowing through vacuum duct 178. Sections 172 and 174 of SiO collection chamber 106, respectively, have outlet valves 182 and 184 for removing collected SiO. The floors of section 172 and 174 of the SiO chambers are designed to act as hoppers to facilitate removal of collected SiO.

The SiO yield may be taken to other sections of the factory for further treatment, packaging and so forth.

Non-oxidizing gas has to be added during heat-treatment of the reagent mixture to preserve the non-oxidizing atmosphere in reaction chamber 158. Therefore, one or more non-oxidizing gas induction pipes 186 pass through the furnace walls. In the shown embodiment, non-oxidizing gas induction pipe 186 extends into furnace chamber 110 through the ceiling and the floor of the carriage platform. Each induction pipe extending through the ceiling of furnace 110 passes through muffle 156 to reaction chamber 158. On the other hand, induction pipe 186 extending through the floor of the carriage platform, may be vertically movable so that it may pass through the carriage and discharge the non-oxidizing gas directly into reagent mixture containers 128 on carriage 124. The pipe 186 extending through the floor may be lowered while carriage 124 is moving so not to interfere with the carriage's travel. Alternatively, carriage 124 may have a discharge nozzle, the upper end of which is directed toward the containers thereon and the lower end of which extends down through the carriage floor. The discharge nozzle carried by the carriage connects to induction pipe 186 by means of an appropriate coupler or connector when carriage 124 is properly positioned for heat-treatment.

Cooling chamber 104 is defined by vertically extending side walls 188 and a ceiling (not shown) in a manner similar to the foregoing pre-heating chamber 102. One or more non-oxidizing gas induction ports 192 and an exhaust port 194 for inert gas replacement and exhausting of the non-oxidizing gas pass through side walls 188. Induction ports 192 connect to a non-oxidizing gas source through non-oxidizing gas induction pipes 196. On the other hand, exhaust port 194 connects to an exhaust pipe 198.

Heat distribution in pre-heating chamber 102, furnace chamber 110 and cooling chamber 104 is illustrated in FIG. 6. As shown in FIG. 6, reagent mixture 126 on carriage 124 is heated to about 100° C. in pre-heating chamber 102. Pre-heating chamber 102 is set at atmospheric pressure, i.e. 1 atm. Non-oxidizing gas, e.g. $N_2$ gas or Ar gas, is introduced into the pre-heating chamber through non-oxidizing gas inlet 140. Therefore, reagent mixture 126 is pre-heated under non-oxidizing conditions at atmospheric pressure. The temperature of reagent mixture 126 rises at a rate of approximately 300° C. per hour in pre-heating chamber 102.

Carriage 124, carrying the reagent mixture 126 in container 128, stays within the pre-heating chamber throughout this pre-heating treatment. Door 112 is opened to allow carriage 124 to enter furnace chamber 110 after a predetermined period of time which should be sufficiently long to pre-heat the reagent mixture to about 1000° C. At the same time, door 116 allows the next carriage 124 to enter the pre-heating chamber.

In furnace chamber 110, reagent mixture 126 on carriage 124 is heated to about 1600° C. by means of heating means 160. The rate of increase in the reagent mixture temperature in reaction chamber 158 is about 200° C. per hour until reagent mixture 126 is heated to 1600° C. Heat-treatment is performed under a non-oxidizing atmosphere of non-oxidizing gas, e.g. $N_2$, Ar or the like. The pressure in furnace chamber 110 is held to approximately 0.05 atm. SiO vapor is generated by reagent mixture 126 by such heat treatment. SiO vapor is transported by the flow of the non-oxidizing gas to SiO collection chambers 106 through SiO collection ducts 164. As the SiO vapor travels to SiO collection chambers 106, and within SiO collection chamber 106 itself, the SiO vapor is cooled until it condenses into fine-grained, solid-state SiO.

As set forth below, since the inner end of vacuum duct 178 reduces the internal pressure of SiO collection chamber 106 and furnace chamber 110 has filter 180, gaseous or particulate SiO will not enter the vacuum duct. Therefore, the problem of pollution does not arise.

Condensed SiO is accumulated in the hoppers in SiO collection chambers 106. Outlet valves 182 and 184 are then opened to retrieve the collected SiO.

Door 114 is opened to allow carriage 124 to move into cooling chamber 104 after a predetermined period of time sufficient to remove all of the SiO from the reagent mixture 126. At the same time, carriage 124 in pre-heating chamber 102 enters the furnace chamber for the next SiO producing heat-treatment. Furthermore, the next carriage 124 is moved into pre-heating chamber 102 in preparation for the next SiO producing heat-treatment in the furnace chamber.

The reagent mixture 126 in carriage 124 is forcibly cooled by introducing a relatively cool non-oxidizing gas into cooling chamber 104. Therefore, within the cooling chamber, the non-oxidizing gas serves as a cooling medium for the reagent mixture. Cooling chamber 104 is at atmospheric pressure, i.e. 1 atm. After sufficient cooling, the by-product, such as zirconia, alumina, calcia and so forth, which depends on the starting material such as zircon, mullite, wollastonite and so forth, used as an $SiO_2$-containing material, can be retrieved. The resultant by-product is of high purity.

Figure 7:
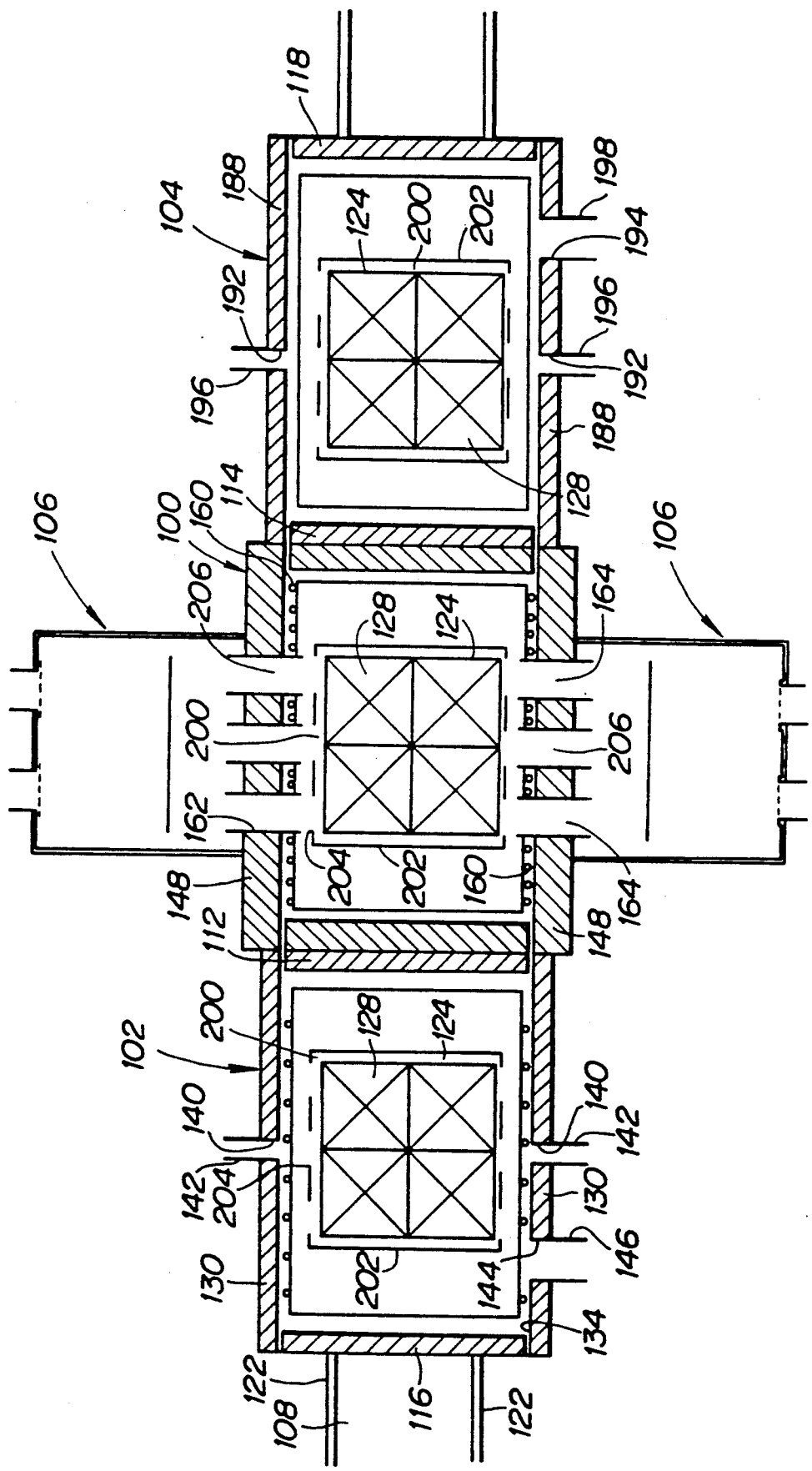
FIG. 7 is a plan view of another preferred embodiment of an SiO manufacturing system according to the invention.
Figure 8:
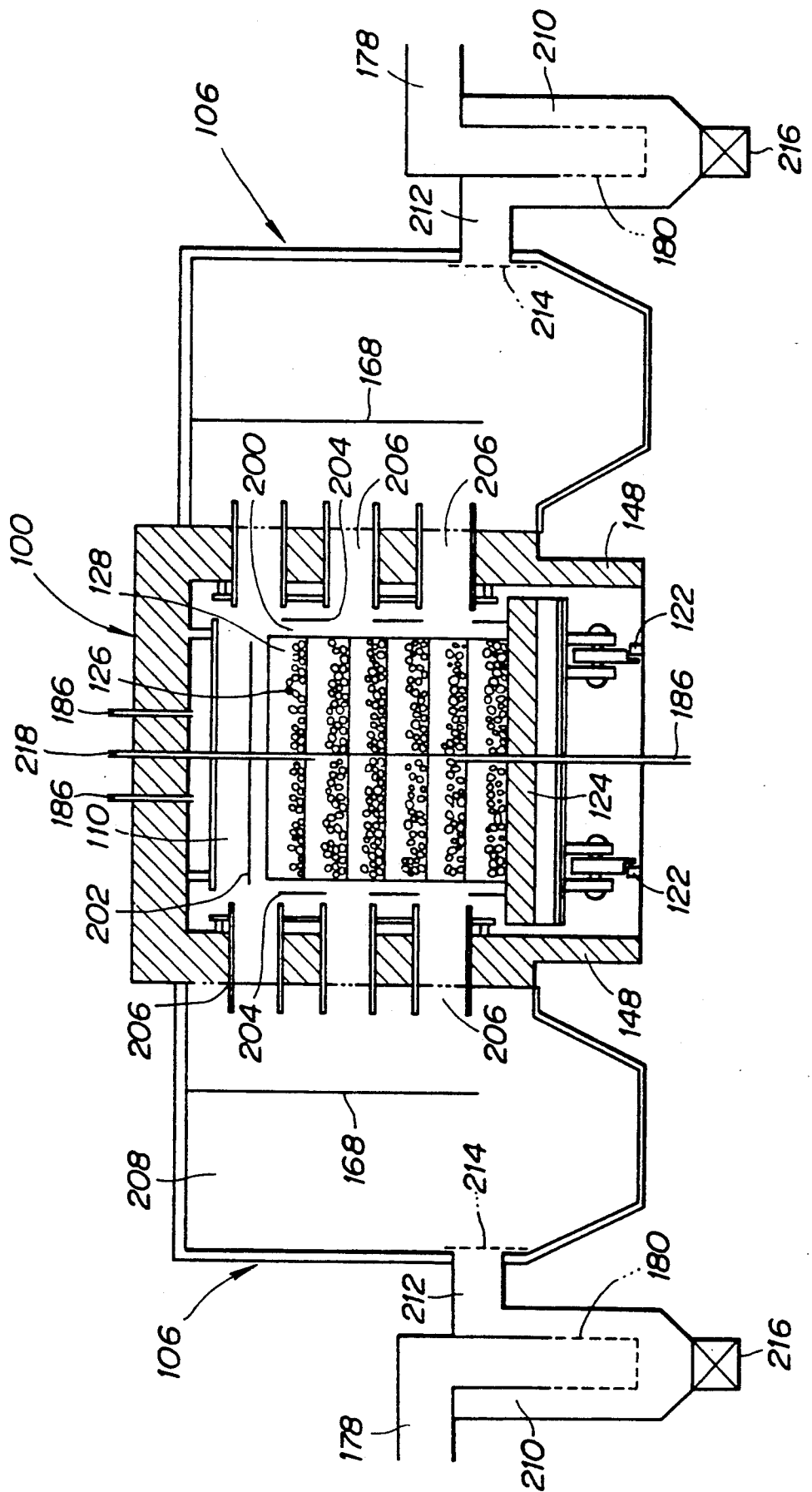
FIG. 8 is a transverse section of a further preferred system of FIG. 7, in the portion of the heating furnace.

FIGS. 7 and 8 show the second embodiment of the SiO producing system according to the present invention. To avoid redundant recitation for the same structural components as that in the first embodiment, like reference numerals are used for identifying like components. This second embodiment of the SiO producing system is adapted to produce a larger amount of fine grain SiO in comparison with that produced in the first embodiment.

Therefore, carriage 124 is adapted to handle a larger number of reagent mixture containers 128 containing reagent mixture. A larger volume of reaction chamber 200 is required so that the apparatus can handle a larger amount of the reagent mixture of the SiO containing material and Si and/or C containing material. Reaction chamber 200 is formed by a muffle 202. Muffle 202 is mounted on carriage 124 to be carried with reagent mixture 126 in containers 128 on the carriage. Muffle 202 is formed with a plurality of through openings 204 through which SiO vapor generated during the heat-treatment flows to SiO collection chambers 106 with the flow of non-oxidizing gas. For higher efficiency of transfer of the SiO vapor to collection chambers 106, through openings 204 are formed at positions respectively corresponding to a plurality of SiO collection ducts 206 extending through the side walls 148 of furnace 100.

SiO collection chamber 106 is separated into two sections 208 and 210, similar to the foregoing embodiment. A communication passage 212 is provided between sections 208 and 210 of SiO collection chamber 106 to establish fluid communication therebetween. Communication passage 212 has an end opening to section 208, to which a filter 214 is fitted. Heat insulating plate 168 is provided within section 208 for insulating heat radiated from furnace chamber 110 in a manner similar to the former embodiment. The aforementioned end of communication passage 212 opens at a relatively lower portion of section 208. The other end of communication passage 212 opens at the top of the other section 210. Section 210 has a smaller volume than that of section 208. Vacuum duct 178 is equipped with a filter 180. Section 210 also has a bottom serving as a hopper with an outlet valve 216 for removing the fine-grained solid-state SiO from SiO collection chamber 106.

On the other hand, in order to keep the atmosphere in furnace chamber 110 as a non-oxidizing atmosphere, an additional non-oxidizing gas induction pipe 218 is provided. The additional non-oxidizing gas induction pipe 218 extends through ceiling 148 of the furnace and further extends through the ceiling of muffle 202. Pipe 218 may be vertically movable toward and away from carriage 124 to avoid interfering with the travel of carriage 124. For instance, while carriage 124 is stopped at the position in the furnace where the heat-treatment for the reagent mixture is to take place, pipe 218 is in the lowered position to discharge the non-oxidizing gas into reaction chamber 200. On the other hand, when carriage 124 travels from pre-heating chamber 102 to furnace chamber 110 or from the furnace chamber to cooling chamber 104, pipe 218 is shifted upwardly out of muffle 202 to allow carriage 124 with reagent mixture containers 128 and muffle 202 to travel.

In the alternative, it is possible to provide a non-oxidizing gas discharge nozzle for muffle 202 and connect the discharge nozzle to the pipe by means of an appropriate coupler or connector.

With the aforementioned construction, the SiO production system of FIGS. 7 and 8 operates in substantially the same manner as that recited with respect to the former embodiment of FIGS. 4 and 5.

Figure 9:
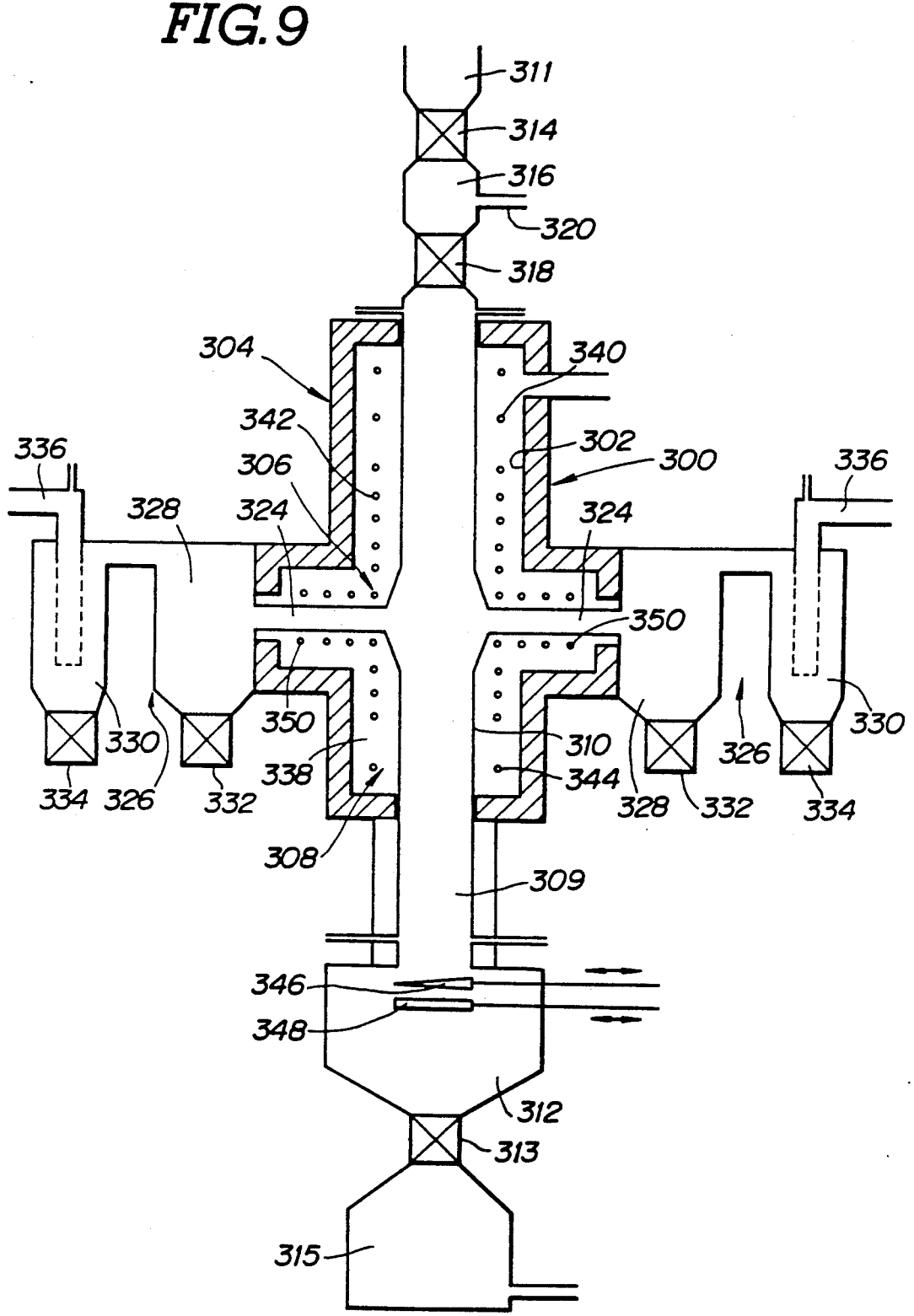
FIG. 9 is a cross-section of a further preferred embodiment of a SiO producing system according to the invention.

FIG. 9 shows another embodiment of the SiO producing system according to the present invention. In this embodiment, the SiO production process is implemented by means of a vertical furnace 300, to which the aforementioned reagent mixture, i.e. a mixture of $SiO_2$ containing material and Si and/or C containing material, is supplied continuously for continuous production of fine-grained SiO and by-product.

The vertical furnace 300 of this embodiment defines a vertically extending furnace chamber 302. Furnace chamber 302 is divided into three zones, i.e. a pre-heating zone 304, a heat-treatment zone 306 and a cooling zone 308. An essentially cylindrical muffle 310 extends through the overall length of furnace chamber 302 through pre-heating chamber 304, heat-treatment zone 306 and cooling zone 308. Muffle 310 further extends downwardly through furnace 300 to form a cylindrical extension 309. The lower end of cylindrical extension 309 is connected to a by-product collection chamber 312. The by-product collection chamber 312 has an outlet valve 313 for removing the by-product collected and accumulated therein. A gas replacement chamber 315 is located below by-product collecting section 312. Gas replacement chamber 315 communicates with an exhaust duct.

The top of muffle 310 connects to hopper 311 for continuously supplying the reagent mixture through a supply control valve 314, a gas replacement chamber 316 and a supply control valve 318. Gas replacement chamber 316 connects to an exhaust duct 320 for exhausting waste gas. Non-oxidizing gas induction pipes 322 connect to the top of muffle 310 at the outside of the furnace 300 and adjacent to the lower end of cylindrical extension 309. Muffle 310 also has a pair of branches 324 which serve as SiO collection ducts. SiO collection ducts 324 communicate with SiO collection chambers 326. SiO collection chambers 326 are defined by outer cells thereof, made of steel plate.

Similar to the former embodiments, SiO collection chambers 326 of this embodiment are respectively separated into two sections 328 and 330. Bottoms of respective sections 328 and 330 are formed to serve as hoppers. Outlet valves 332 and 334 are provided at the bottom of sections 328 and 330 for removing fine-grained SiO collected and accumulated therein.

A vacuum duct 336 is inserted into the section 330 to connect section 330 with a vacuum source (not shown). By the vacuum produced section 330, furnace chamber 302 and the interior of muffle 310 maintain a vacuum.

As will be seen from FIG. 9, muffle 310 has an essentially smaller diameter than the inner diameter of furnace 300 to define therebetween a heating chamber 338. Heaters 340, 342 and 344 are provided within heating chamber 338 surrounding muffle 310. Heater 340 is disposed within pre-heating zone 304 for heating the reagent mixture in the pre-heating zone at a temperature up to approximately 1000° C. Heater 342 is disposed within heat-treatment zone 306 and is adapted to heat the regent mixture passing the heat-treatment zone at an essentially constant temperature, i.e. 1600° C. On the other hand, heater 344 in cooling zone 308 generates a substantially low temperature in comparison with those generated in pre-heating zone 304 and heat-treatment zone 306.

Burden supports 346 and 348 are provided within by-product collection chamber 312 opposing the lower end of cylindrical extension 309 of muffle 310. Burden supports 346 and 348 are respectively movable perpendicularly to the axis of the furnace to adjust the amount of the by-product falling into by-product collection chamber 312 and thereby adjusting the speed of downward travel of the reagent mixture held in muffle 310. The passage area defined by burden supports 346 and 348 may be controlled in relation to the path area defined in the supply control valves 314 and 318.

In the SiO producing process according to the invention with the SiO producing system of FIG. 9, the reagent mixture is introduced into the internal space of muffle 310. The reagent mixture in the internal space of 310 travels through pre-heating zone 304, heat-treatment zone 306 and cooling zone 308. During this process, non-oxidizing gas is introduced into the internal space of muffle 310 so that heat-treatment for generating the SiO producing process takes place in a non-oxidizing atmosphere. Reduced internal pressure is maintained in furnace chamber 302 by the effect of induction of a vacuum through vacuum ducts 336 which extend into SiO collection chamber 326.

Similar to the foregoing embodiment, the reagent mixture in muffle 310 is pre-heated in the pre-heating zone at about 1000° C. along the heat distribution curve illustrated in FIG. 6, during downward travel. The reagent passing pre-heating zone 304 subsequently enters heat-treatment zone 306. In the region in the heat-treatment zone, where SiO collection ducts 324 are provided, the temperature of the reagent mixture is maintained constant at about 1600° C., which is high enough to cause generation of SiO vapor. SiO vapor generated from the reagent mixture due to thermal reaction caused in the reagent mixture is drawn into the SiO collection chambers with the non-oxidizing gas flow. Heaters 350, surrounding SiO collection ducts 324, maintain the SiO in the vapor state. SiO vapor is cooled and condensed into fine-grained solid-state SiO in SiO collection chambers 326. Fine-grained SiO can be accumulated within SiO collection chambers 326 by continuously processing the reagent mixture. The collected SiO is removed from SiO collection chambers 326 through outlet valves 332.

On the other hand, the remaining material from which the SiO is removed is transferred to the cooling zone 308 to be cooled. The cooled SiO removed material serves as a by-product of substantially high purity. Such by-product is accumulated within by-product collecting chamber 312 and removed therefrom through outlet valve 313.

As will be appreciated herefrom, the embodiment of FIG. 9 facilitates continuous processing for SiO production and can provide substantially high efficiency in production of fine-grained SiO.

Therefore, the present invention fulfills all of the objects and advantages sought therefor.

While the present invention has been disclosed hereabove in terms of the specific embodiments which implement the present invention, it should be appreciated that the present invention can be implemented in any ways different from the shown embodiments. Furthermore, various modifications of the shown embodiment could reach similar results. Therefore, the present invention should be understood to include all the embodiments and modifications which can embody the invention without departing from the principle of the invention, which is set out in the appended claims.

What is claimed is:

1. A method for producing a silicon monoxide powder in a reaction system which includes a reaction chamber, a collection chamber and a duct establishing communication between said reaction chamber and said collection chamber, said method comprising the steps of:

providing a mixture of a silicon dioxide containing material and metallic silicon and/or carbon containing material in said reaction chamber;

maintaining said reaction system at a subatmospheric pressure while introducing a non-oxidizing gas into said reaction chamber to produce a non-oxidizing gas stream from said reaction chamber to said collection chamber, said introduced gas being in addition to any gas produced by the reaction, heating said mixture in said reaction chamber at elevated temperatures in the presence of said non-oxidizing gas for generating silicon monoxide gas;

condensing said silicon monoxide to form finely-divided solid-state silicon monoxide while effectively transferring said silicon monoxide from said reaction chamber to said collection chamber with said non-oxidizing gas stream; and collecting said finely-divided solid-state silicon monoxide in said collection chamber.

2. A method as set forth in claim 1, wherein said elevated temperatures are defined in a range of 1300° C. to 2000° C. and said subatmospheric pressures are defined as pressures less than or equal to 0.01 atm.

3. A method as set forth in claim 1, wherein said silicon dioxide containing material is selected from the group consisting of zircon ($ZrO_2SiO_2$), mullite ($Al_2O_3 \cdot 2SiO_2$), wollastonite ($CaO \cdot SiO_2$) and silicon dioxide powder.

4. A method as set forth in claim 3, wherein said carbon containing material is selected from the group consisting of petroleum coke, coal pitch, carbon-black and organic resin.

5. A method as set forth in claim 4, wherein said non-oxidizing gas is selected from the group consisting of $N_2$ gas, Ar gas and CO gas.

6. A method as set forth in claim 2, which further comprises a step of recovering by-product of the reaction in said reaction chamber after said heating process.

7. A method as set forth in claim 6, wherein said silicon dioxide containing material is zircon ($ZrO_2 \cdot SiO_2$).

8. A method as set forth in claim 7, wherein said by-product is zirconia ($ZrO_2$).

9. A method as set forth in claim 6, wherein said silicon dioxide containing material is mullite ($Al_2O_3 \cdot 2SiO_2$).

10. A method as set forth in claim 9, wherein said by-product is alumina ($Al_2O_3$).

11. A method as set forth in claim 6, wherein said silicon dioxide containing material is wollastonite ($CaO \cdot SiO_2$).

12. A method as set forth in claim 11, wherein said by-product is calcium dioxide.

13. A process for manufacturing silicon monoxide powder in a reaction system which includes reaction and collection chamber and a duct establishing communication between the reaction and collection chambers, said process comprising the steps of:

preparing a mixture by mixing a silicon dioxide containing material and metallic silicon and/or a carbon containing material;

maintaining said reaction system at subatmospheric pressure, introducing non-oxidizing gas into said reaction chamber to produce a non-oxidizing gas stream from said reaction chamber to said collection chamber; said introduced gas being in addition to any gas produced by the reaction;

supplying said material mixture into a reaction chamber;

heating said mixture in said reaction chamber at elevated temperature in the presence of said non-oxidizing gas for generating silicon monoxide gas;

transferring said silicon monoxide gas generated in said reaction chamber to said collecting chamber; and cooling said silicon monoxide gas to form solidstate silicon monoxide while said silicon monoxide gas is transferred with said non-oxidizing gas from said reaction chamber to said collection chamber through said duct and collecting said solid-state silicon monoxide in said collecting chamber.

14. A process as set forth in claim 13, which further comprises the steps of pre-heating said mixture before supplying the mixture into said reaction chamber.

15. A process as set forth in claim 14, which further comprises the step of recovering by-product of the reaction in said reaction chamber after said heating process.

16. A process as set forth in claim 13, wherein said elevated temperature are defined in a range of 1300° C. to 2000° C. and said subatmospheric pressures are defined less than or equal to 0.1 atm.

17. A process as set forth in claim 15, wherein said material mixture is intermittently supplied at a predetermined rate for allowing continuous operation of the silicon monoxide manufacturing process.

18. A process as set forth in claim 15, wherein said supply of said material is performed continuously to cause travel of said material mixture through said reaction chamber.

19. A process as set forth in claim 16, wherein said silicon dioxide containing material is zircon ($ZrO_2 \cdot SiO_2$).

20. A process as set forth in claim 19, wherein said by-product is zirconia ($ZrO_2$).

21. A process as set forth in claim 16, wherein said silicon dioxide containing material is mullite ($Al_2O_3 \cdot 2SiO_2$).

22. A process as set forth in claim 21, wherein said by-product is alumina ($Al_2O_3$).

23. A process as set forth in claim 16, wherein said silicon dioxide containing material is wollastonite ($CaO \cdot SiO_2$).

24. A process as set forth in claim 23, wherein said by-product is calcia calcium dioxide.

* * * * *

UNITED STATES PATENT AND TRADEMARK OFFICE
CERTIFICATE OF CORRECTION

PATENT NO. : 5,096,685

DATED : March 17, 1992

INVENTOR(S) : Toshihiko Funahashi et al

It is certified that error appears in the above-identified patent and that said Letters Patent is hereby corrected as shown below:

On the Title page, Section [63], bridging Lines 2 and 3, please change "Jul. 24, 1986" to --Jul. 29, 1986--; in section [30], kindly change "Jul. 27, 1985 [JP]" to --Jul. 29, 1985 [JP]--.

In Columns 7 and 8, in Table 1, the eighth group under Column 1, (the entry before "Comp. Ex. 5), please change "Ex. 2" to --Ex. 4--.

Signed and Sealed this

Twenty-ninth Day of June, 1993

Attest:

MICHAEL K. KIRK

Attesting Officer

Acting Commissioner of Patents and Trademarks